(12) United States Patent     (10) Patent No.: US 9,261,123 B2
Lange     (45) Date of Patent: Feb. 16, 2016

(54) GANGED FURNITURE CONNECTOR

(75) Inventor: Glenn A. Lange, Ferdinand, IN (US)

(73) Assignee: Best Chairs Incorporated, Ferdinand, IN (US)

( * ) Notice: Subject to any disclaimer, the term of this patent is extended or adjusted under 35 U.S.C. 154(b) by 282 days.

(21) Appl. No.: 13/437,404

(22) Filed: Apr. 2, 2012

(65) Prior Publication Data

US 2012/0251233 A1    Oct. 4, 2012

Related U.S. Application Data

(60) Provisional application No. 61/470,656, filed on Apr. 1, 2011.

(51) Int. Cl.
*F16B 12/10*     (2006.01)
*A47C 1/124*     (2006.01)

(52) U.S. Cl.
CPC .............. *F16B 12/10* (2013.01); *A47C 1/124* (2013.01); *Y10T 403/70* (2015.01)

(58) Field of Classification Search
CPC ....... A47C 1/124; Y10S 403/13; F16B 12/10; F16B 17/00
USPC ............ 403/345, 363, DIG. 13; 297/239, 248
See application file for complete search history.

(56) References Cited

U.S. PATENT DOCUMENTS

| | | | | |
|---|---|---|---|---|
| 3,009,738 | A * | 11/1961 | Herbert .......................... | 297/248 |
| 3,237,984 | A * | 3/1966 | Schneider et al. ............ | 297/248 |
| 4,995,668 | A * | 2/1991 | Zivari .......................... | 297/248 |
| 5,002,337 | A * | 3/1991 | Engel et al. ................... | 297/239 |
| 6,406,094 | B2 * | 6/2002 | Lohness et al. ............... | 297/248 |
| 7,806,474 | B2 * | 10/2010 | Wahl et al. .................... | 297/248 |
| 2005/0253430 | A1 * | 11/2005 | George et al. ................. | 297/248 |

* cited by examiner

*Primary Examiner* — Daniel P Stodola
*Assistant Examiner* — Jonathan Masinick
(74) *Attorney, Agent, or Firm* — James C. Eaves, Jr.; Douglas G. Gallagher; Bingham Greenebaum Doll LLP

(57) ABSTRACT

A furniture connector includes a substantially planar first tab extending from a substantially planar base. The substantially planar base includes a furniture attachment portion attached to a furniture component. A tab-receiving first aperture is sized to receive a second tab of an other furniture connector while the first tab is received in a tab-receiving second aperture of the other furniture connector, and while the second tab extends in a same direction as the first tab.

18 Claims, 9 Drawing Sheets

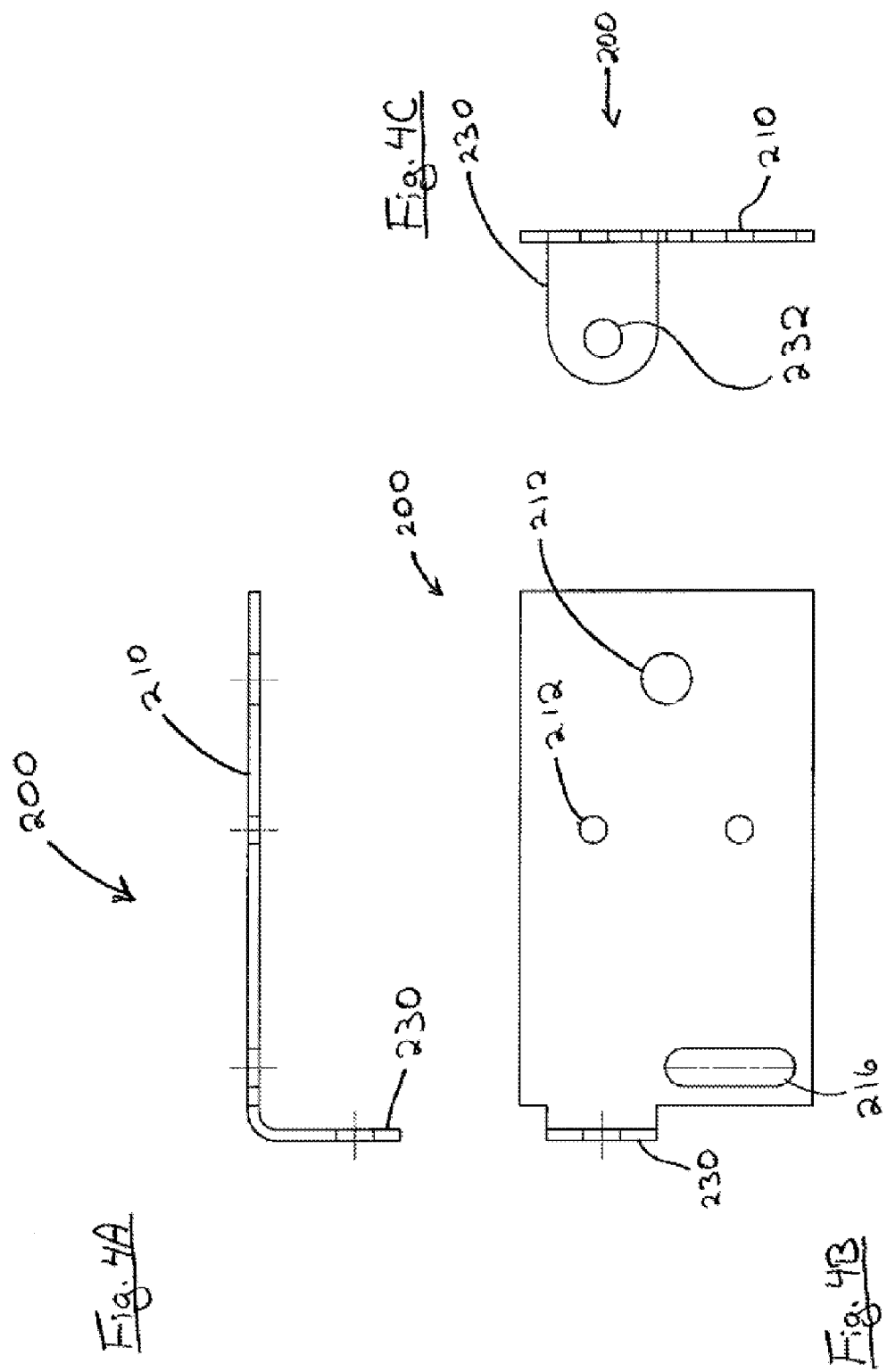

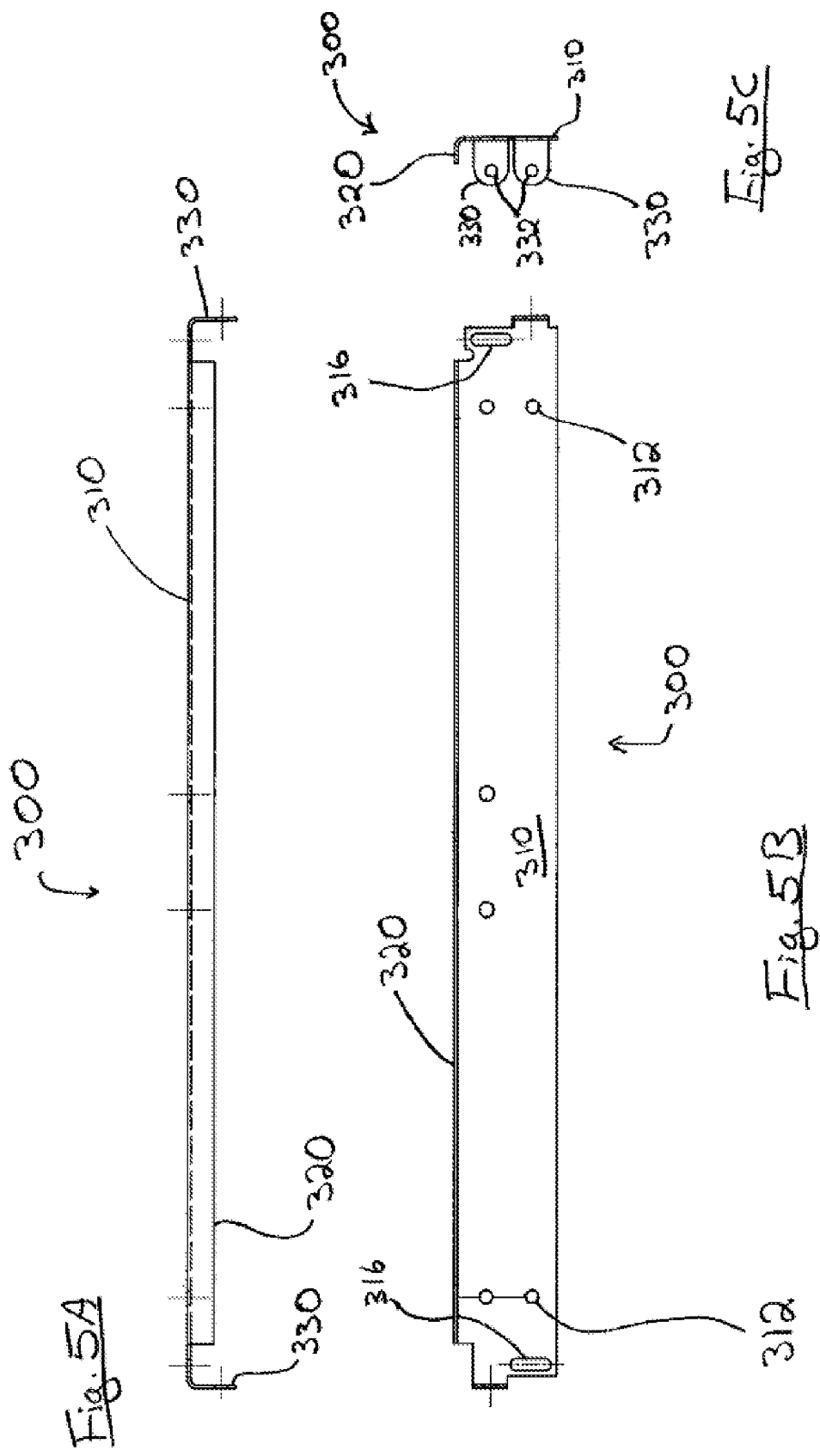

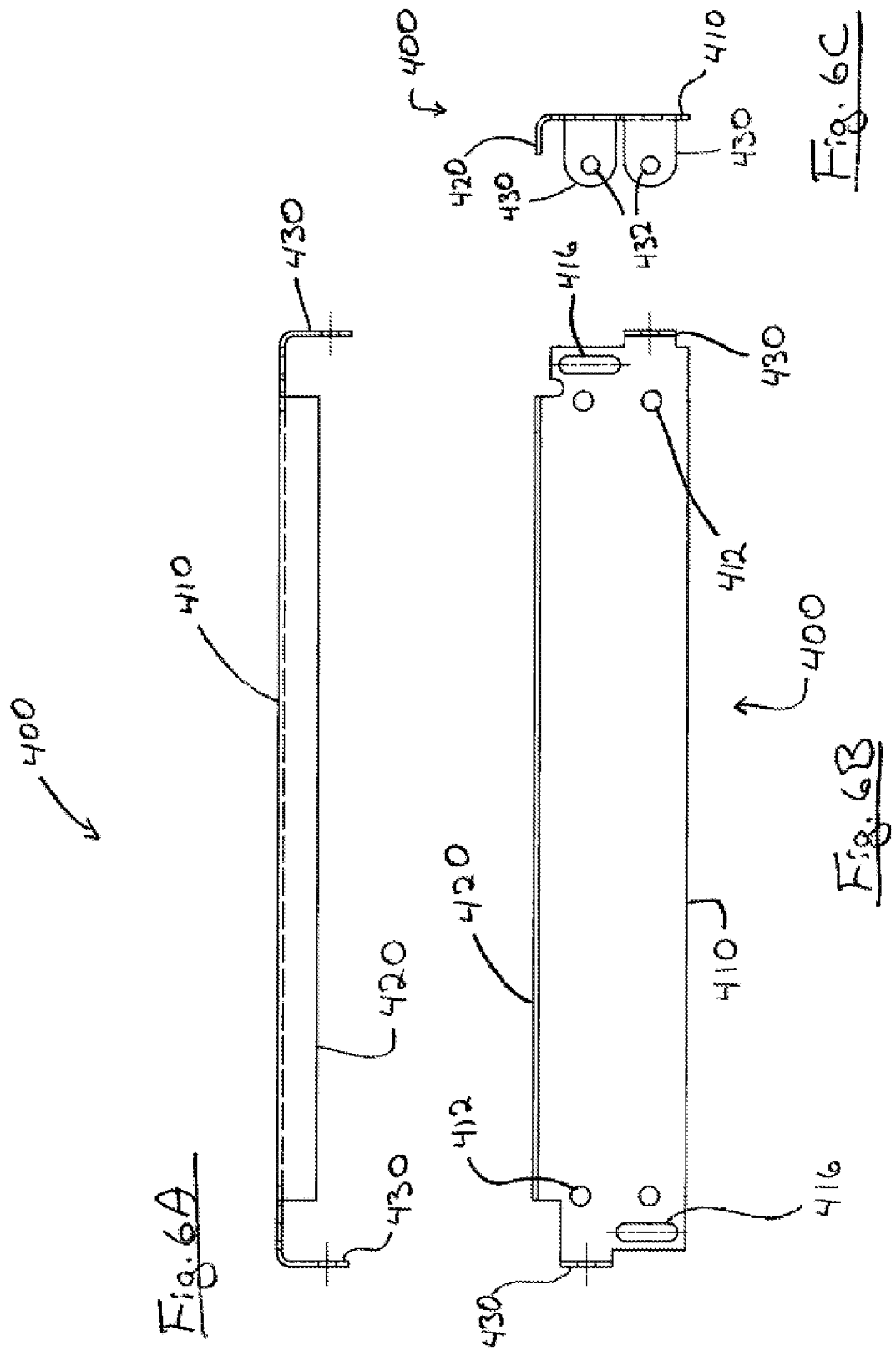

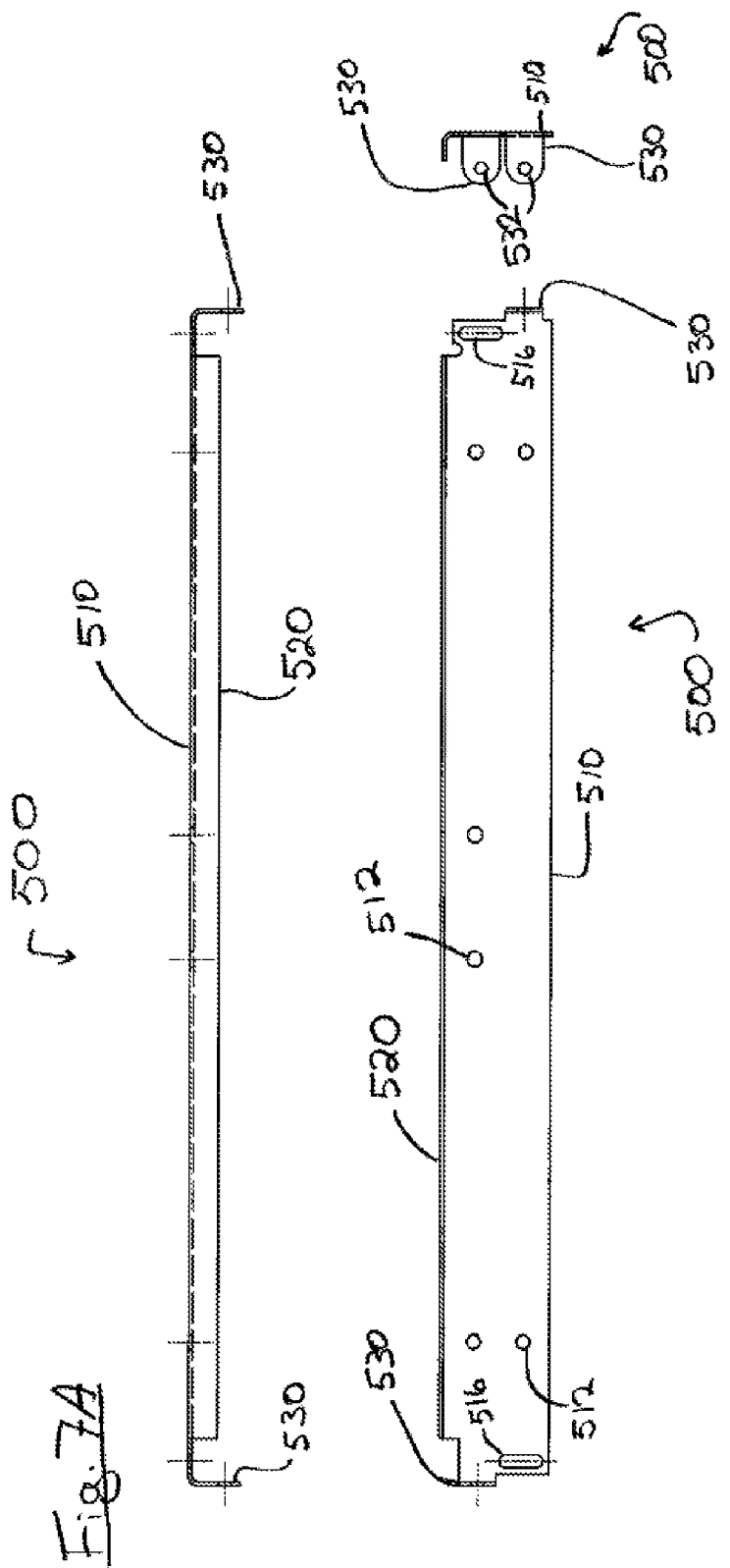

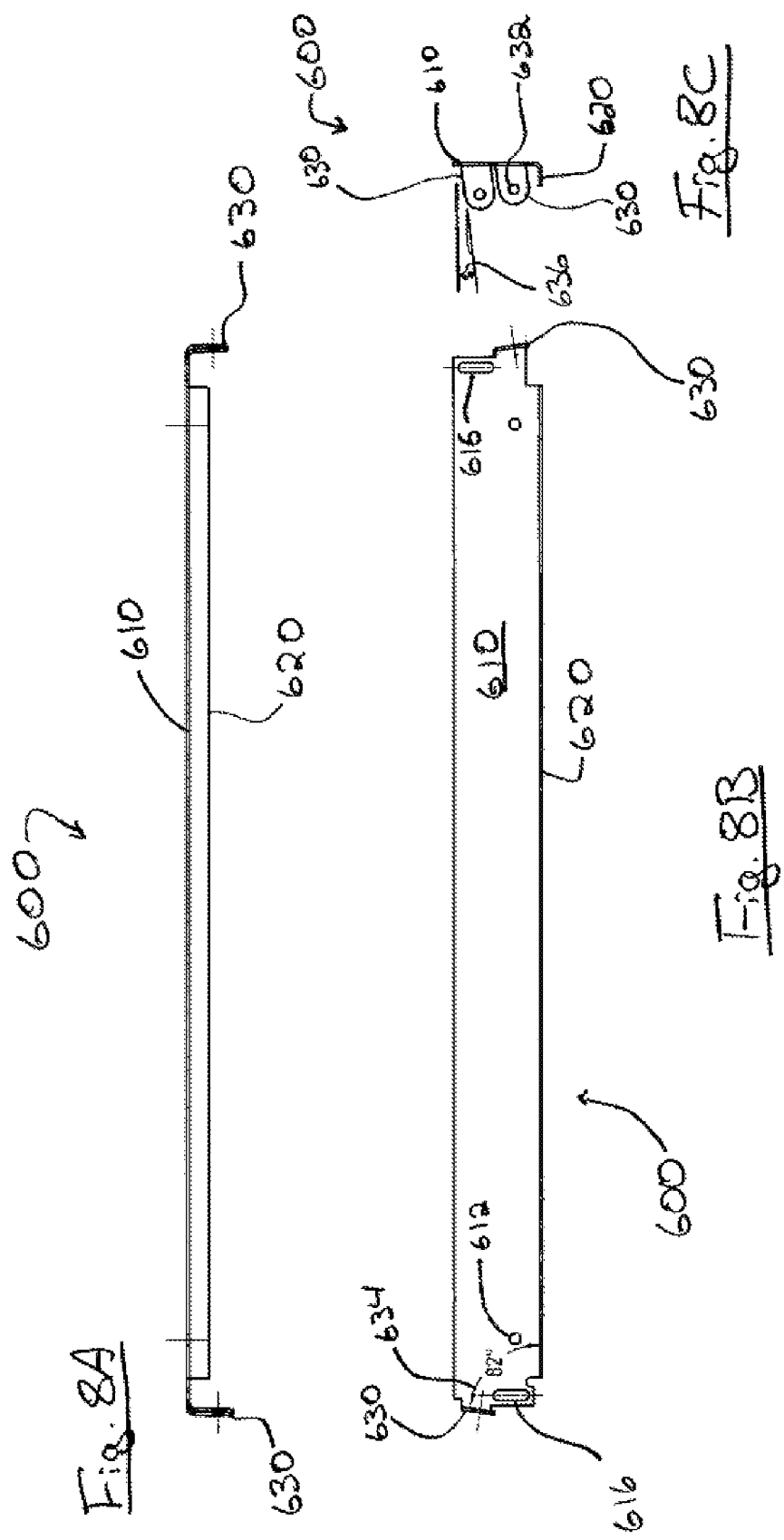

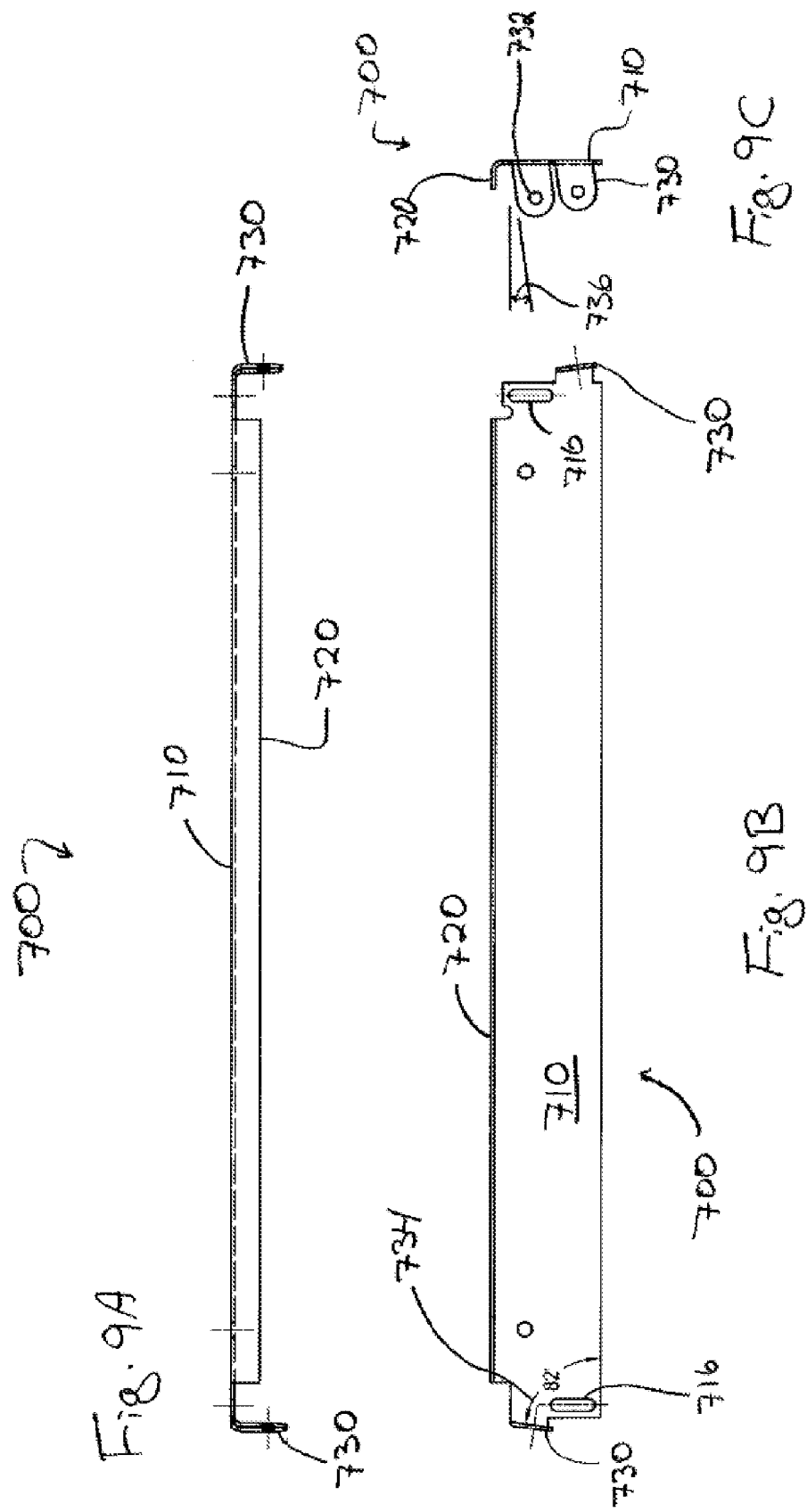

GANGED FURNITURE CONNECTOR

REFERENCE TO RELATED APPLICATION

The application claims the benefit of U.S. Provisional Patent Application No. 61/470,656, titled GANGED FURNITURE CONNECTOR, by Glenn A. Lange, filed Apr. 1, 2011, the entirety of which is hereby incorporated herein by reference.

FIELD

Embodiments disclosed herein relate to connecting furniture components to one another and, in particular, to a connector for connecting (ganging) two or more furniture components together.

BACKGROUND

Situations exist in which it is desirable to gang furniture components. For example, when seating a large number of people, individual chairs can be ganged (connected to one another) to form rows of chairs that will remain in rows and in their proper orientation better than if the chairs were not ganged. Some types of furniture are manufactured with built-in ganging connectors to facilitate ganging; however, many types of furniture do not include built-in ganging connectors.

Many furniture ganging connectors in use today include two different (non-identical) connectors that connect to one another. For example, some ganging connectors have different left and right or male and female connectors. Other connectors have complicated structures that can be difficult to manufacture, such as when the connector includes multiple bends into multiple planes and directions, or structures that can weaken the inherent strength of the material the connector is made from. Still other ganging connectors require considerable user strength, finesse, and/or effort to either completely lift the furniture component off the ground and/or tilt the furniture component an excessive amount to connect the connectors. And still other ganging connectors do not provide a simple manner in which the pieces may be locked together to prevent unwanted separation of the furniture components.

SUMMARY

Embodiments disclosed herein provide a ganged furniture connector. In particular, certain embodiments include ganged furniture connectors that may be attached to separate furniture components to facilitate connecting the furniture components to one another. Other embodiments include ganged furniture connectors that have a simple structure, are strong, and are easily manufactured, while still other embodiments include a ganged furniture connector that connects to another identical ganged furniture connector. Additional embodiments include ganged furniture connectors that easily connect to one another without requiring excessive tilting or maneuvering of one piece of furniture, while further embodiments provide a simple and straightforward way to lock two connectors together.

In one embodiment, the connector for ganging furniture components comprises a substantially planar base; and a substantially planar tab extending from the substantially planar base; wherein the substantially planar base includes a furniture attachment portion configured for attachment to a furniture component, and a tab-receiving aperture sized to receive a tab substantially identical to the substantially planar tab.

In another embodiment, a kit for ganging furniture components comprises a first connector adapted to be attached to a first furniture component; and a second connector adapted to be attached to a second furniture component; each of the first connector and second connector including a receiving portion and an insertion portion; wherein, when the first connector is attached to the first furniture component and the second connector is attached to the second furniture component, insertion of the insertion portion of the first connector into the receiving portion of the second connector connects the first and second furniture components to one another.

In a further embodiment, a method for ganging furniture components comprises attaching at least one first connector to a first furniture component, the first connector having a substantially planar first base and a substantially planar first tab extending from the first base along a plane substantially perpendicular to the first base, the first base having a first tab-receiving aperture; attaching at least one second connector to a second furniture component, the second connector having a substantially planar second base and a substantially planar second tab extending from the second base along a plane substantially perpendicular to the second base, the second base having a second tab-receiving aperture; and inserting either the second tab into the first tab-receiving aperture or the first tab into the second tab-receiving aperture.

This summary is provided to introduce a selection of the concepts that are described in further detail in the detailed description and drawings contained herein. This summary is not intended to identify any primary or essential features of the claimed subject matter. Some or all of the described features may be present in the corresponding independent or dependent claims, but should not be construed to be a limitation unless expressly recited in a particular claim. Each embodiment described herein is not intended to address every object described herein, and each embodiment does not necessarily include each feature described. Other forms, embodiments, objects, advantages, benefits, features, and aspects of the present invention will become apparent to one of skill in the art from the detailed description and drawings contained herein.

BRIEF DESCRIPTION OF THE DRAWINGS

Some of the figures shown herein may include dimensions or may have been created from scaled drawings. However, such dimensions, or the relative scaling within a figure, are by way of example and not to be construed as limiting.

FIGS. 4A, 4B and 4C are front elevational, top plan and side elevational views of a ganged furniture connector according to another embodiment of the present invention.

FIGS. 5A, 5B and 5C are front elevational, top plan and side elevational views of a ganged furniture connector according to still another embodiment of the present invention.

FIGS. 6A, 6B and 6C are front elevational, top plan and side elevational views of a ganged furniture connector according to yet another embodiment of the present invention.

FIGS. 7A, 7B and 7C are front elevational, top plan and side elevational views of a ganged furniture connector according to a further embodiment of the present invention.

FIGS. 8A, 8B and 8C are front elevational, top plan and side elevational views of a ganged furniture connector according to still a further embodiment of the present invention.

FIGS. 9A, 9B and 9C are front elevational, top plan and side elevational views of a ganged furniture connector according to an additional embodiment of the present invention.

DETAILED DESCRIPTION

Figure 1:
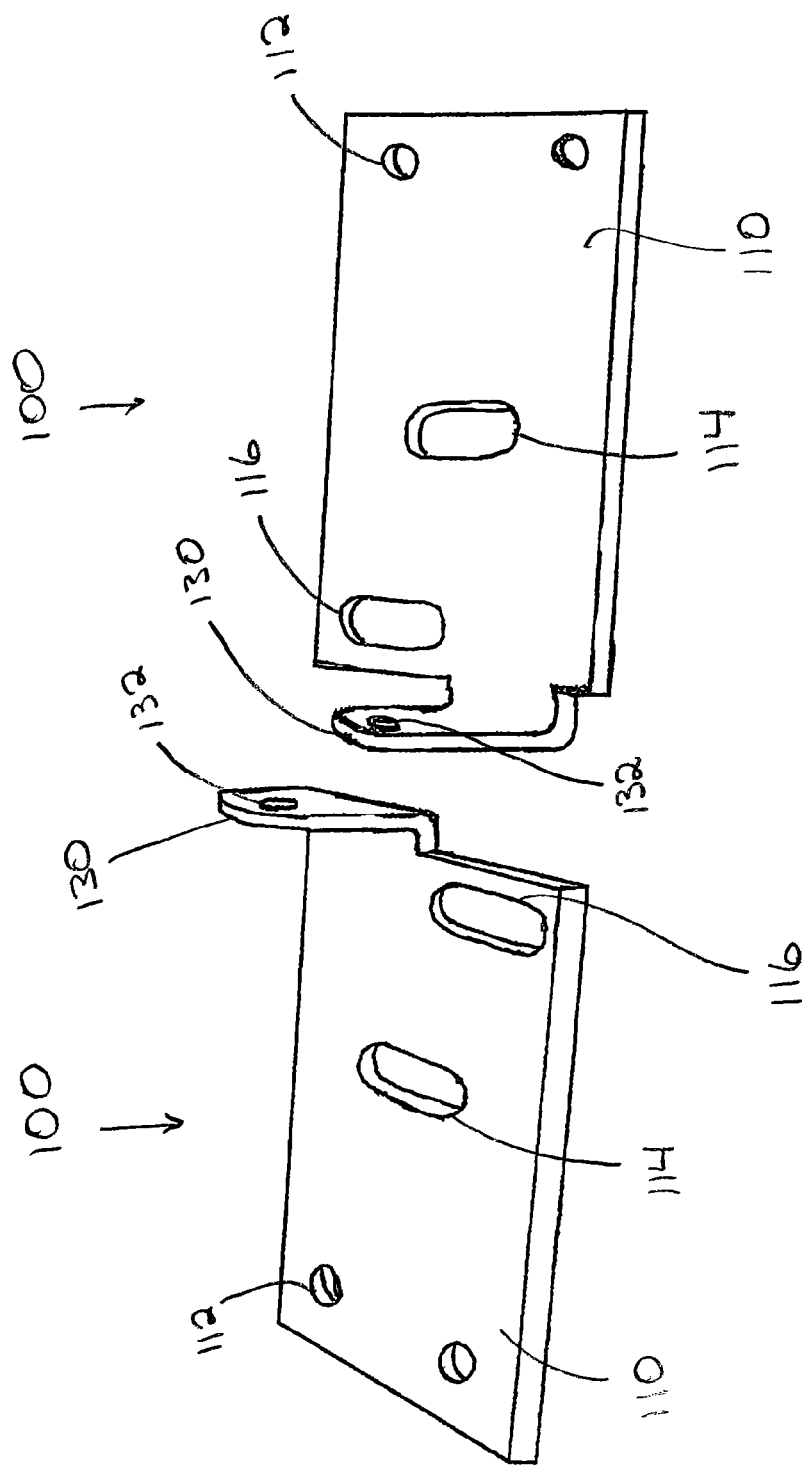
FIG. 1 is a perspective view of two ganged furniture connectors according to one embodiment of the present invention.

For the purpose of promoting an understanding of the principles of the invention, reference will now be made to one or more selected embodiments illustrated in the drawings and specific language will be used to describe the same. It will nevertheless be understood that no limitation of the scope of the invention is thereby intended; any alterations and further modifications of the described or illustrated embodiments, and any further applications of the principles of the invention as illustrated herein are contemplated as would normally occur to one skilled in the art to which the invention relates. At least one embodiment of the invention is shown in great detail, although it will be apparent to those skilled in the relevant art that some features or some combinations of features may not be shown for the sake of clarity.

Embodiments of the present invention provide a ganged furniture connector that a user may attach to various types of components in order to gang the components together. Example components include furniture-related components, which include furniture pieces (such chairs, benches, tables, desks, cabinets, dressers, couches, shelving units, book cases) and other items (such as pinball machines, arcade games, juke boxes, and free-standing appliances, such as freezers and refrigerators) that may be ganged together with embodiments of the present disclosure.

Example embodiments include interlocking metal connectors that are installed on the bottoms of furniture components allowing the furniture components to be connected or "ganged" together. Exemplary connectors include metal plates having an elongated slot opening on one half of one end of the connector and a tab on the other half of the same end of the connector, the tab extending upward at a right angle and sized to be received within the elongated slit. The connectors may be installed at the front and rear corners of one or both sides of a piece of furniture, for example an upholstered, wooden or metal piece of furniture. The connectors may include a single slot and tab, or may include two slot and tab pairs located at opposite ends of an elongated metal base that extends the width (or depth) of the piece of furniture. The ganging (interlocking) of the furniture components may be accomplished by inserting the protruding tab of one connector into the elongated slot of the other connector, each connector being attached to a separate piece of furniture. Once engaged, the connectors restrain both front-to-back and side-to-side movement of the furniture pieces relative to one another.

Other example embodiments include universal connectors, where one connector is adapted to interconnect with another identical connector, there being no difference between "left" or "right" (or "front" or "back") connectors. As such, only one type of connector need be manufactured, simplifying the manufacturing process. Furthermore, by having a single configuration or type of connector, there is no need for users to buy two types of connectors or to concern themselves with ensuring that the proper type of connector is attached to the proper furniture component since all connectors are the same. At least one example connector is easy to manufacture, is easily connected to a piece of furniture, and is easily connected to another connector when the furniture components are ganged.

Depicted in FIG. 1 is a ganged furniture connector, for example, connector 100, according to one embodiment of the present invention. Connector 100 includes a substantially planar base 110 and a substantially planar tab 130 extending from one end of base 110.

Base 110 includes attachment portions, for example, furniture attachment apertures 112 and 114, for attaching connector 100 to a furniture component. Base 110 also includes a tab connection portion, for example, tab-receiving aperture 116, for connecting connector 100 to another connector, such as another instance of connector 100.

Tab 130 is oriented in a plane that is approximately perpendicular to the plane in which base 110 is oriented. Tab 130 optionally includes a locking portion, for example locking aperture 132, for locking connector 100 to another connector, such as another instance of connector 100.

In use, connector 100 is attached to a furniture component by, for example, placing connector 100 against a furniture component with tab 130 and tab-receiving aperture 116 extending outward from the side of the furniture component, inserting attachment hardware (such as screws and/or nails) through apertures 112 and/or 114, and engaging the attachment hardware with the furniture and connector 100. To reduce the likelihood that connector 100 will become a hazard, for example a tripping or snagging hazard, connector 100 may be attached to the furniture component with tab 130 and tab-receiving aperture 116 extending only a minimal distance from the side of the furniture component. A second connector 100 is similarly attached to another furniture component.

Figure 2:
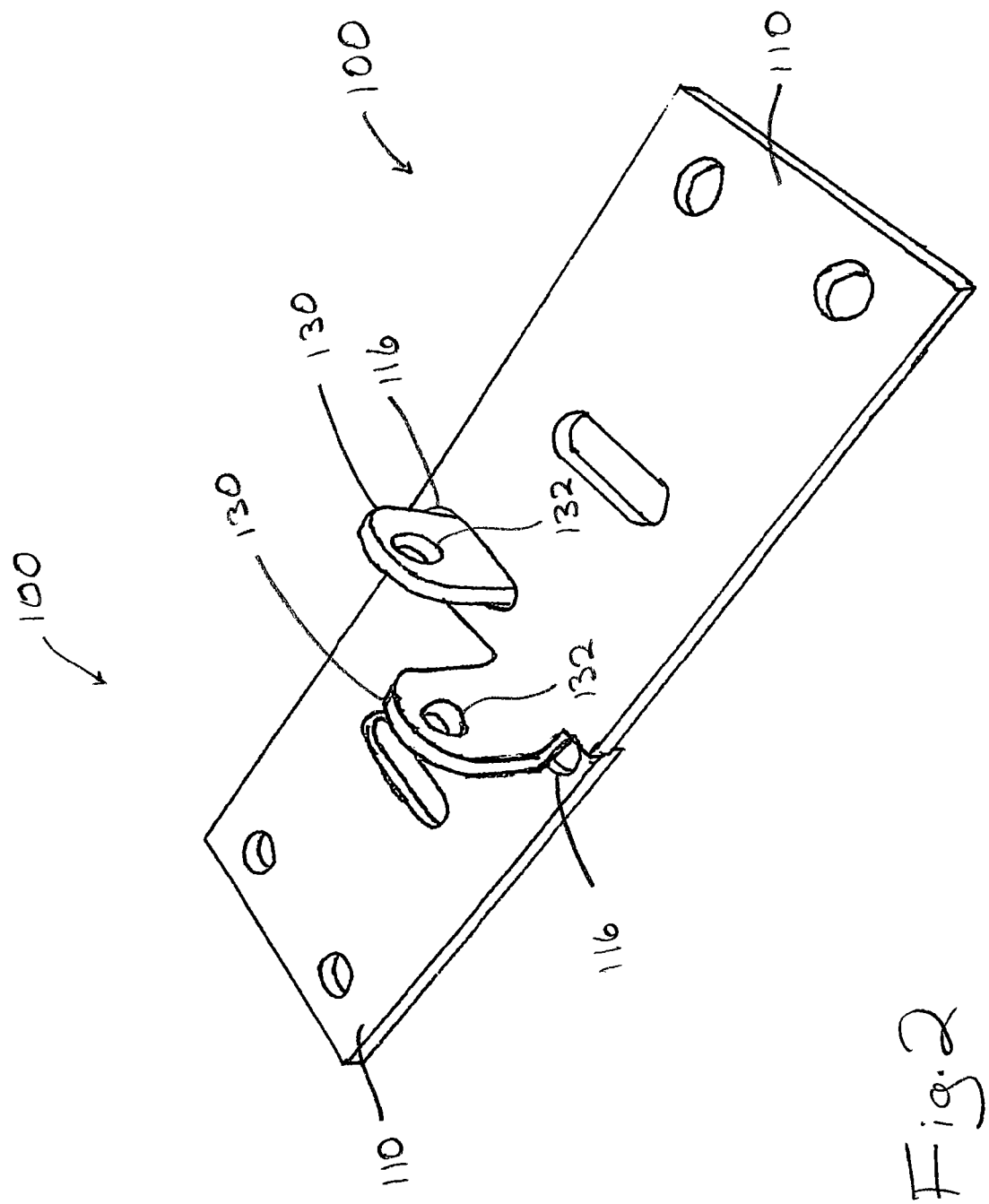
FIG. 2 is a perspective view of the ganged furniture connectors depicted in FIG. 1 connected to one another.
Figure 3:
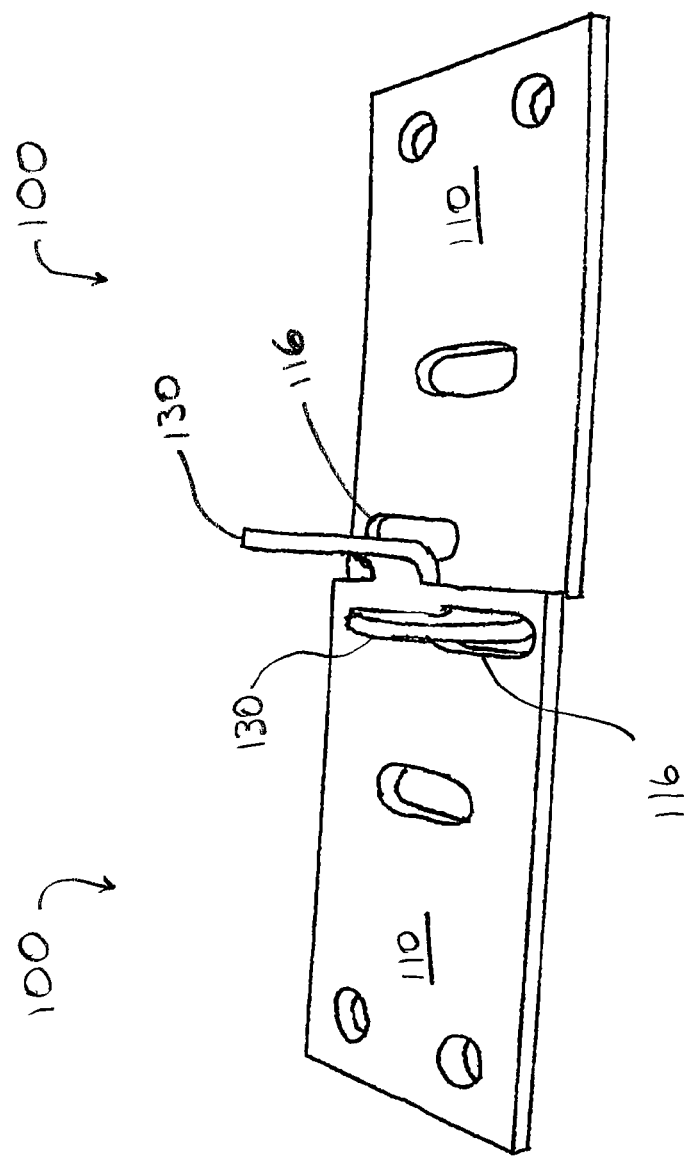
FIG. 3 is an alternate perspective view of the connected ganged furniture connectors depicted in FIG. 2.

FIGS. 2 and 3 depict two connectors 100 connected to one another. Tab 130 of one connector is received within aperture 116 of the other connector, while tab 130 of the other connector rests atop base 110 and adjacent aperture 116 of the one connector.

To connect first and second furniture components with the pair of attached connectors 100, a first connector and a second connector, the first and second furniture components are placed adjacent to one another. It will be assumed for the sake of clarity that the first furniture component is "moved" while the second furniture component remains "stationary" while the two components are ganged (connected), although it should be appreciated that either or both furniture components may be moved when being connected. The side of the first furniture component (the "moved" component) with the attached connector 100 is lifted slightly—enough to raise moved base 110 above stationary tab 130—and the moved first furniture component is repositioned toward the stationary second furniture component to orient tab-receiving aperture 116, the receiving portion, of the moved first furniture component above tab 130, the insertion portion, of the stationary second furniture component. The moved first furniture component is then lowered, thereby capturing the tab 130 attached to the stationary second furniture component in the tab-receiving aperture 116 attached to the moved first furniture component.

In one embodiment, a locking member, for example a pin, is inserted into aperture 132 of tab 130 after tab 130 has been inserted through a tab-receiving aperture, such as aperture 116. The inserted locking member inhibits the separation of the two connectors, thereby locking the connectors (and the furniture components to which the connectors are attached)

together. Example locking members include pins, zip-ties, clips, and padlocks that may be constructed of metal, plastic or other materials capable of resisting the removal of tab 130 from tab-receiving aperture 116.

Two or more pairs of connectors 100 may be used to connect two furniture components to one another, one pair being placed, for example, near the front of the furniture's side, and other pair being placed, for example, near the rear of the furniture component's same side. After the front pair of connectors, for example, are connected, the rear pair of connectors are connected.

As illustrated in FIGS. 1 through 3, tab-receiving aperture 116 is sized to allow some movement of tab 130 while inserted within aperture 116. This feature can facilitate an easier connection between two connectors 100 since there is greater tolerance in the positioning of aperture 116 above tab 130 prior to aperture 116 being lowered to receive tab 130. This feature also accommodates the use of two pairs of connectors 100 to connect furniture components together by allowing movement between the two furniture components while the second connector pair is connected. Alternate embodiments, however, include connectors 100 with apertures 116 that snugly receive tab 130 when it is desired to minimize the relative movement between the connectors when connected to one another.

Depicted in FIGS. 4A, 4B and 4C is a ganged furniture connector 200 according to another embodiment of the present invention. Connector 200 includes a substantially planar base 210 and a substantially planar tab 230 extending from one end of base 210.

Base 210 includes attachment portions, for example, furniture attachment apertures 212, for attaching connector 200 to a furniture component. Base 210 also includes a tab connection portion, for example, tab-receiving aperture 216, for connecting connector 200 to another connector, such as another connector 200 or connector 100.

Tab 230 is oriented in a plane that is approximately perpendicular to the plane in which base 210 is oriented. Tab 230 optionally includes a locking portion, for example locking aperture 232, for locking connector 200 and the connector to which connector 200 is attached together.

Connector 200 is attached to a furniture component, and is used to connect and optionally lock furniture components together in a manner similar to that described above with respect to the embodiment depicted in FIGS. 1-3. Tab-receiving aperture 216 can optionally be sized to snugly receive tab 230 to minimize the relative movement between the connectors when connected to one another or to allow some movement of tab 230 while inserted within aperture 216 depending on the particular requirements.

Depicted in FIGS. 5A, 5B and 5C is a ganged furniture connector 300 according to still another embodiment of the present invention. Connector 300 includes a base 310, tabs 330 extending from two opposing ends of base 310, and an optional flange 320 extending from one side of base 310. Optionally, base 310, flange 320 and tabs 330 are substantially planar members, as depicted. The planes in which base 310, flange 320, and tab 330 are each disposed are mutually perpendicular. In other words, flange 320 is perpendicular to base 310 and flange 330, and base 310 is perpendicular to flange 330.

Base 310 includes attachment portions, for example, furniture attachment apertures 312, for attaching connector 300 to a furniture component. Base 310 also includes tab connection portions, for example, tab-receiving apertures 316, for connecting connector 300 to other connectors, such as one or more connectors 300, 200 and/or 100.

Each tab 330 optionally includes a locking portion, for example locking aperture 332, for locking connector 300 and the connector to which connector 300 is attached together.

In use, connector 300 is attached to a furniture component by, for example, placing connector 300 against the bottom of a furniture component with tabs 330 and tab-receiving apertures 316 extending outward from the sides of the furniture component and with flange 320 being positioned along the front or back edge of the furniture component. Attachment hardware (such as a screws and/or nails) are inserted through apertures 312 and the attachment hardware is engaged with the furniture and with connector 300. To reduce the likelihood that connector 300 will become a hazard, for example a tripping or snagging hazard, connector 300 is optionally sized such that tab 330 and tab-receiving aperture 316 extend only a minimal distance from the sides of the furniture component. A second connector 300 is similarly attached to another furniture component.

To connect furniture components that each have a connector 300 attached to it, the furniture components are placed adjacent to one another. It will be assumed for the sake of clarity that one furniture component is "moved" while the other furniture component remains "stationary" while the two components are ganged (connected), although it should be appreciated that both furniture components may be moved when being connected. The side of one furniture component (the "moved" component) with the attached connector 300 is lifted slightly—enough to raise moved base 310 above stationary tab 330—and the moved furniture component is repositioned toward the stationary furniture component to orient tab-receiving aperture 316 of the moved furniture component above tab 330 of the stationary furniture component. The moved furniture component is then lowered, thereby capturing the tab 330 of the stationary furniture component in the tab-receiving aperture 316 of the moved furniture component.

In one embodiment, a locking member, for example a pin, is inserted into aperture 332 of tab 330 after tab 330 has been inserted through a tab-receiving aperture, such as aperture 316. The inserted locking member inhibits the separation of the two connectors, thereby locking the connectors (and the furniture components to which the connectors are attached) together. Example locking members include pins, zip-ties, clips, and padlocks that may be constructed of metal, plastic or other materials capable of resisting the removal of tab 330 from tab-receiving aperture 316.

Two connectors 300 may be connected to each furniture component by, for example, placing one connector 300 on the front and one connector 300 on the back of the furniture component. After one connector (e.g., the front connector) is connected to a connector on an adjacent furniture component, the other connector (e.g., the rear connector) is connected to another connector on the adjacent furniture component.

Tab-receiving aperture 316 can optionally be sized to snugly receive tab 330 to minimize the relative movement between the connectors when connected to one another or to allow some movement of tab 330 while inserted within aperture 316 depending on the particular requirements.

Depicted in FIGS. 6A, 6B and 6C is a ganged furniture connector 400 according to yet another embodiment of the present invention. Connector 400 includes a base 410, tabs 430 extending from two opposing ends of base 410, and an optional flange 420 extending from one side of base 410. Optionally, base 410, flange 420 and tabs 430 are substantially planar members, as depicted. The planes in which base 410, flange 420, and tab 430 are each disposed are mutually perpendicular. In other words, flange 420 is perpendicular to base 410 and flange 430, and base 410 is perpendicular to flange 430.

Base 410 includes attachment portions, for example, furniture attachment apertures 412, for attaching connector 400 to a furniture component. Base 410 also includes tab connection portions, for example, tab-receiving apertures 416, for connecting connector 400 to other connectors, such as one or more connectors 400, 300, 200 and/or 100.

Each tab 430 optionally includes a locking portion, for example locking aperture 432, for locking connector 400 and the connector to which connector 400 is attached together.

Connector 400 is attached to a furniture component, and is used to connect and optionally lock furniture components together in a manner similar to that described above with respect to the embodiment depicted in FIGS. 5A, 5B and 5C. Tab-receiving aperture 416 can optionally be sized to snugly receive tab 430 to minimize the relative movement between the connectors when connected to one another or to allow some movement of tab 430 while inserted within aperture 416 depending on the particular requirements.

Depicted in FIGS. 7A, 7B and 7C is a ganged furniture connector 500 according to a further embodiment of the present invention. Connector 500 includes a base 510, tabs 530 extending from two opposing ends of base 510, and an optional flange 520 extending from one side of base 510. Optionally, base 510, flange 520 and tabs 530 are substantially planar members, as depicted. The planes in which base 510, flange 520, and tab 530 are each disposed are mutually perpendicular. In other words, flange 520 is perpendicular to base 510 and flange 530, and base 510 is perpendicular to flange 530.

Base 510 includes attachment portions, for example, furniture attachment apertures 512, for attaching connector 500 to a furniture component. Base 510 also includes tab connection portions, for example, tab-receiving apertures 516, for connecting connector 500 to other connectors, such as one or more connectors 500, 400, 300, 200 and/or 100.

Each tab 530 optionally includes a locking portion, for example locking aperture 532, for locking connector 500 and the connector to which connector 500 is attached together.

Connector 500 is attached to a furniture component, and is used to connect and optionally lock furniture components together in a manner similar to that described above with respect to the embodiment depicted in FIGS. 5A, 5B and 5C. Tab-receiving aperture 516 can optionally be sized to snugly receive tab 530 to minimize the relative movement between the connectors when connected to one another or to allow some movement of tab 530 while inserted within aperture 516 depending on the particular requirements.

Depicted in FIGS. 8A, 8B and 8C is a ganged furniture connector 600 according to an additional embodiment of the present invention. Connector 600 includes a base 610, tabs 630 extending from two opposing ends of base 610, and an optional flange 620 extending from one side of base 610. Optionally, base 610, flange 620 and tabs 630 are substantially planar members, as depicted.

The planes in which base 610 and flange 620 are disposed are perpendicular, and the planes in which base 610 and tab 630 are disposed are perpendicular. However, the planes in which flange 620 and tab 630 are disposed are not perpendicular, but are rather separated by angle 634, which does not equal 90 degrees. Angle 634 is less than 90 degrees in the illustrated embodiment, although other embodiments include angles 634 that are greater than 90 degrees. Since tab-receiving apertures 616 are perpendicular to flange 620 and, therefore, nonperpendicular with respect to tabs 630, furniture components connected to one another by connectors 600 will be angled with respect to one another.

Base 610 includes attachment portions, for example, furniture attachment apertures 612, for attaching connector 600 to a furniture component. Base 610 also includes tab connection portions, for example, tab-receiving apertures 616, for connecting connector 600 to other connectors, such as one or more connectors 600, 500, 400, 300, 200 and/or 100.

Each tab 630 optionally includes a locking portion, for example locking aperture 632, for locking connector 600 and the connector to which connector 600 is attached together.

As best seen in FIG. 8C, tabs 630 are unequal in length and tilted with respect to both base 610 and flange 620 by a nonzero angle 636.

Connector 600 is attached to a furniture component, and is used to connect and optionally lock furniture components together in a manner similar to that described above with respect to the embodiment depicted in FIGS. 5A, 5B and 5C. Tab-receiving aperture 616 can optionally be sized to snugly receive tab 630 to minimize the relative movement between the connectors when connected to one another or to allow some movement of tab 630 while inserted within aperture 616 depending on the particular requirements.

Depicted in FIGS. 9A, 9B and 9C is a ganged furniture connector 700 according to yet another embodiment of the present invention. Connector 700 includes a base 710, tabs 730 extending from two opposing ends of base 710, and an optional flange 720 extending from one side of base 710. As best seen comparing FIGS. 8B and 9B, flange 720 is positioned on the side of the connector where tabs 730 are angling toward one another, in contrasts to connector 600 where flange 620 is positioned on the side of the connector where tabs 630 are angling away from one another. Tabs 630 also tilt away from flange 720 (as best seen in FIG. 9C), in contrast to connector 600 where (as best seen in FIG. 8C) flanges 620 tilt toward flange 620.

Optionally, base 710, flange 720 and tabs 730 are substantially planar members, as depicted.

The planes in which base 710 and flange 720 are disposed are perpendicular, and the planes in which base 710 and tab 730 are disposed are perpendicular. However, the planes in which flange 720 and tab 730 are disposed are not perpendicular, but are rather separated by angle 734, which does not equal 90 degrees. Angle 734 is less than 90 degrees in the illustrated embodiment, although other embodiment include angles 734 that are greater than 90 degrees. Since tab-receiving apertures 716 are perpendicular to flange 720 and, therefore, nonperpendicularly angled with respect to tabs 730, furniture components connected to one another by connectors 700 will be angled with respect to one another.

Base 710 includes attachment portions, for example, furniture attachment apertures 712, for attaching connector 700 to a furniture component. Base 710 also includes tab connection portions, for example, tab-receiving apertures 716, for connecting connector 700 to other connectors, such as one or more connectors 700, 600, 500, 400, 300, 200 and/or 100.

Each tab 730 optionally includes a locking portion, for example locking aperture 732, for locking connector 700 and the connector to which connector 700 is attached together.

As best seen in FIG. 9C, tabs 730 are unequal in length and tilted with respect to both base 710 and flange 720 by a nonzero angle 736.

Connector 700 is attached to a furniture component, and is used to connect and optionally lock furniture components together in a manner similar to that described above with respect to the embodiment depicted in FIGS. 5A, 5B and 5C. Tab-receiving aperture 716 can optionally be sized to snugly receive tab 730 to minimize the relative movement between the connectors when connected to one another or to allow some movement of tab 730 while inserted within aperture 716 depending on the particular requirements.

The disclosed ganged furniture connectors may be constructed of a variety of material that is sufficiently strong and tough to hold the furniture components together without breaking. Example materials include, but are not limited to, various metals, such as steel or other alloys, and tough plastics, such as certain polymers or thermoplastic materials.

Alternate embodiments of the present invention provide ganged furniture connectors that may be attached to a furniture component or another item, such as a wall or floor. Using as illustration the floor example, a user may attach a first connector to a furniture component, a second connector to a floor, and connect the first and second ganged furniture connectors to secure the furniture component to the floor.

Still further embodiments provide a ganged furniture connector that a user may attach to other items, such as pinball machines, arcade games, juke boxes, and free-standing appliances, such as freezers and refrigerators, in order to gang these items together.

While illustrated examples, representative embodiments and specific forms of the invention have been illustrated and described in detail in the drawings and foregoing description, the same is to be considered as illustrative and not restrictive or limiting. The description of particular features in one embodiment does not imply that those particular features are necessarily limited to that one embodiment. Features of one embodiment may be used in combination with features of other embodiments as would be understood by one of ordinary skill in the art, whether or not explicitly described as such. Dimensions, whether used explicitly or implicitly, are not intended to be limiting and may be altered as would be understood by one of ordinary skill in the art. Exemplary embodiments have been shown and described, and all changes and modifications that come within the spirit of the invention are desired to be protected.

What is claimed is:

1. A furniture arrangement, comprising:
   a first furniture connector and a second furniture connector, the first furniture connector including:
   a substantially planar first base; and
   a substantially planar first tab extending from the substantially planar first base;
   wherein the substantially planar first base includes
   a first furniture attachment portion configured for attachment to a furniture component, and
   a tab-receiving first aperture receiving a second tab of the second furniture connector while the first furniture attachment portion and a second furniture attachment portion of the second furniture connector are on substantially opposite lateral sides of the tab-receiving first aperture and the second tab, and while the second tab extends in a same direction from a substantially planar second base of the second furniture connector as the first tab extends from the substantially planar first base.

2. The arrangement of claim 1, wherein the substantially planar first tab includes a locking aperture.

3. The arrangement of claim 1, wherein the first tab extends from an end of the first base.

4. The arrangement of claim 1, further comprising a substantially planar flange extending from the first base.

5. The arrangement of claim 4, wherein the flange extends from a side of the first base.

6. The arrangement of claim 4, wherein the flange extends from the first base along a plane substantially perpendicular to the first base.

7. The arrangement of claim 4, wherein the flange and the first tab extend along planes substantially perpendicular to each other and to the first base.

8. The arrangement of claim 4, wherein the flange and the first tab extend along planes angled less than 90 degrees from each other.

9. The arrangement of claim 4, wherein the flange and the first tab extend along planes angled greater than 90 degrees from each other.

10. The arrangement of claim 1, further comprising a substantially planar third tab extending from the first base, and wherein the substantially planar first base also includes a tab-receiving second aperture, and wherein the first and third tabs extend from opposing ends of the first base, and wherein the tab-receiving first and second apertures are located in proximity to the opposing ends of the first base.

11. The arrangement of claim 1, wherein the tab-receiving first aperture receives the second tab of the second furniture connector while the first tab rests atop a substantially planar second base of the second furniture connector.

12. A furniture arrangement, comprising:
    a first furniture connector and a second furniture connector, the first furniture connector including:
    a substantially planar first base; and
    a first tab extending from the substantially planar first base;
    wherein the substantially planar first base includes
    a furniture attachment portion configured for attachment to a furniture component, and
    a tab-receiving first aperture receiving a second tab of the second furniture connector while the first tab rests atop a substantially planar second base of the second furniture connector, and while the second tab extends in a same direction as the first tab wherein the tab-receiving first aperture receives the second tab of the second furniture connector while the second tab extends from the planar second base in a same direction as the first tab extends from the planar first base.

13. The arrangement of claim 12, wherein the first tab includes a locking aperture.

14. The arrangement of claim 12, further comprising a third tab extending from the first base, and wherein the substantially planar first base also includes a second tab-receiving aperture.

15. The arrangement of claim 14, wherein the first and third tabs are substantially planar and substantially parallel.

16. A furniture arrangement, comprising:
    a first furniture connector including:
    a substantially planar first base having an aperture; and
    a first tab extending from the substantially planar first base; and
    a second furniture connector including:
    a substantially planar second base, the first tab resting atop the substantially planar second base; and
    a second tab extending from the substantially planar second base and received in the aperture wherein the second tab extends from the substantially planar second base in a same direction as the first tab extends from the substantially planar first base.

17. The arrangement of claim 16, wherein the substantially planar first base includes a first furniture attachment portion disposed in a first direction from the aperture, and the substantially planar second base includes a second furniture attachment portion disposed in a second direction from the second tab, the second direction being substantially opposite to the first direction.

18. The arrangement of claim 16, wherein the first tab includes a locking aperture.

\* \* \* \* \*